US010609293B2

(12) United States Patent
Pribble et al.

(10) Patent No.: US 10,609,293 B2
(45) Date of Patent: Mar. 31, 2020

(54) REAL-TIME GLARE DETECTION INSIDE A DYNAMIC REGION OF AN IMAGE

(71) Applicant: Capital One Services, LLC, McLean, VA (US)

(72) Inventors: Jason Pribble, McLean, VA (US); Nicholas Capurso, Tysons Corner, VA (US); Daniel Alan Jarvis, Alexandria, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/999,021

(22) Filed: Aug. 20, 2018

(65) Prior Publication Data

US 2020/0059587 A1 Feb. 20, 2020

(51) Int. Cl.
| | |
|---|---|
| *G06K 9/32* | (2006.01) |
| *H04N 1/00* | (2006.01) |
| *H04N 5/235* | (2006.01) |
| *G06K 9/20* | (2006.01) |
| *G06T 7/13* | (2017.01) |
| *G06T 7/00* | (2017.01) |
| *G06K 9/46* | (2006.01) |
| *G06T 7/20* | (2017.01) |
| *G06T 7/70* | (2017.01) |

(52) U.S. Cl.
CPC ......... *H04N 5/2351* (2013.01); *G06K 9/2054* (2013.01); *G06K 9/4647* (2013.01); *G06T 7/0002* (2013.01); *G06T 7/13* (2017.01); *G06T 7/20* (2013.01); *G06T 7/70* (2017.01); *G06T 2207/30168* (2013.01); *G06T 2207/30176* (2013.01)

(58) Field of Classification Search
None
See application file for complete search history.

(56) References Cited

U.S. PATENT DOCUMENTS

| | | | |
|---|---|---|---|
| 6,360,026 B1 | 3/2002 | Kulkarni et al. | |
| 6,430,320 B1 | 8/2002 | Jia et al. | |
| 6,956,587 B1 | 10/2005 | Anson | |
| 8,855,375 B2 | 10/2014 | Macciola et al. | |
| 9,672,510 B2 | 6/2017 | Roach et al. | |

(Continued)

FOREIGN PATENT DOCUMENTS

CN 106228168 A 12/2016

*Primary Examiner* — Edemio Navas, Jr.
(74) *Attorney, Agent, or Firm* — Harrity & Harrity, LLP

(57) ABSTRACT

A user device may capture a plurality of preview images that each include image data. The user device may process, in substantially real-time, a preview image to identify an object in the preview image, including determining an outline of the object. The user device may create a mask that hides a portion of the image data associated with an area outside of the outline of the object in one or more of the preview images. Based on determining that a parameter associated with glare of the object in the preview images does not satisfy a threshold, the user device may provide, in substantially real-time, feedback to a user, including an instruction to the user to perform an action with respect to the user device or to the object, and, based on determining that the parameter satisfies the threshold, the user device may automatically capture an image of the object.

20 Claims, 10 Drawing Sheets

Glare Histogram of a Preview Image (e.g., pixel brightness histogram)

(56) References Cited

U.S. PATENT DOCUMENTS

| | | | | |
|---|---|---|---|---|
| 2007/0086675 | A1* | 4/2007 | Chinen | G06T 11/00 |
| | | | | 382/284 |
| 2014/0327940 | A1* | 11/2014 | Amtrup | H04N 1/00251 |
| | | | | 358/473 |
| 2016/0350592 | A1* | 12/2016 | Ma | G06K 9/4671 |
| 2016/0357400 | A1* | 12/2016 | Penha | H04N 5/23216 |
| 2017/0147858 | A1* | 5/2017 | Bennett | G06K 9/0061 |
| 2017/0193322 | A1* | 7/2017 | Schiller | A61B 5/0077 |
| 2018/0197039 | A1* | 7/2018 | Guerreiro | B60K 35/00 |
| 2018/0337917 | A1* | 11/2018 | Wallace | H04L 63/0861 |

* cited by examiner

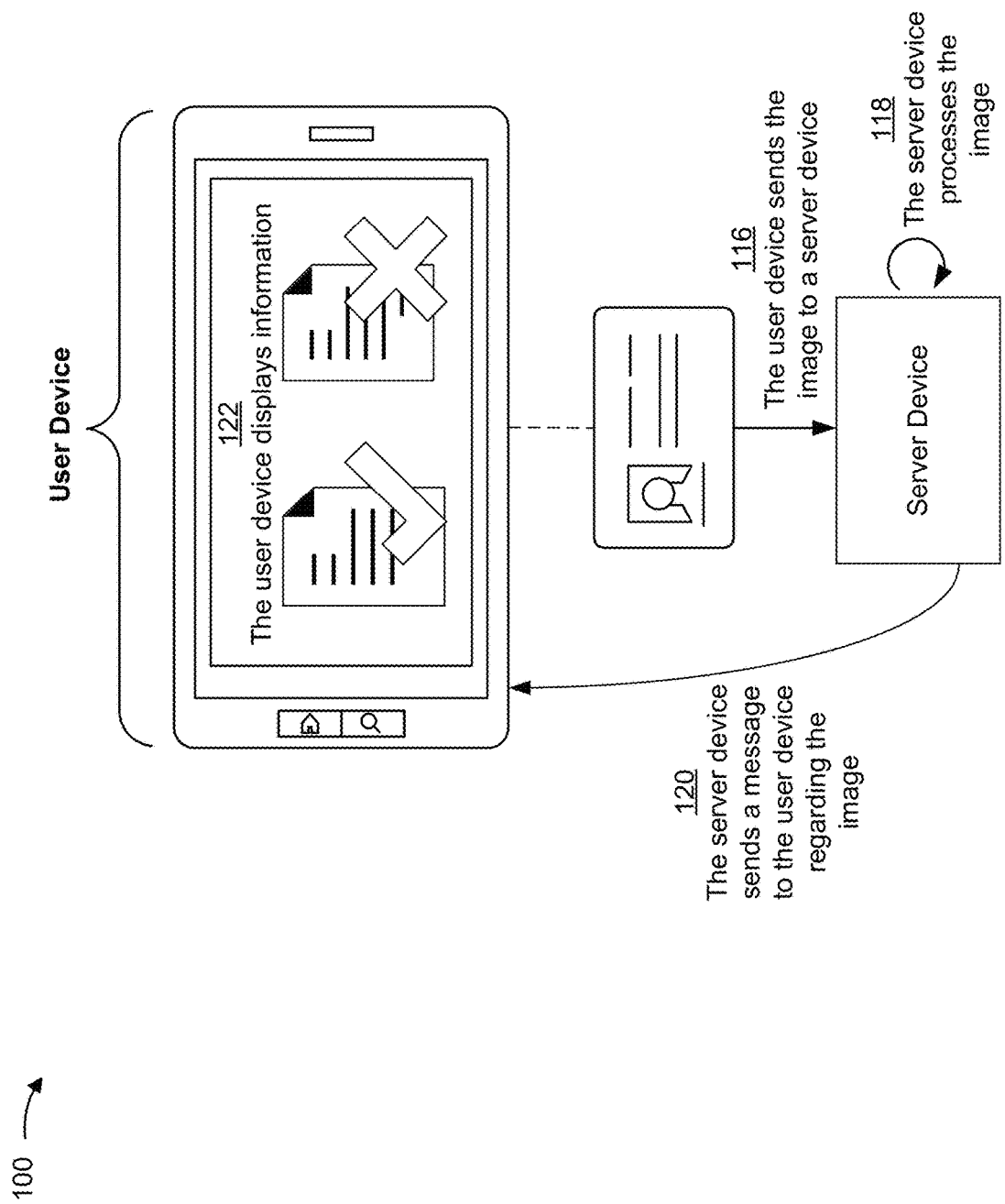

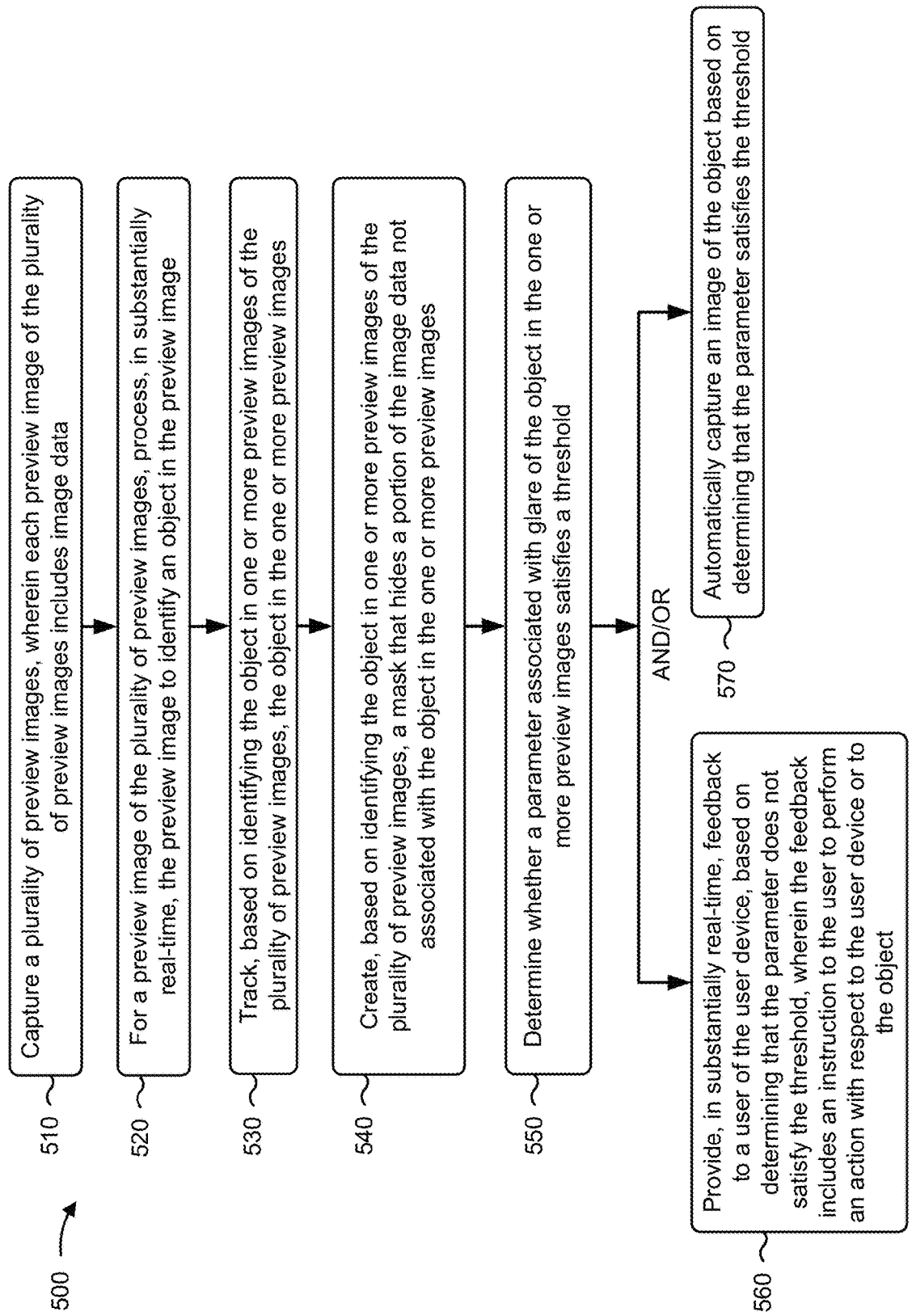

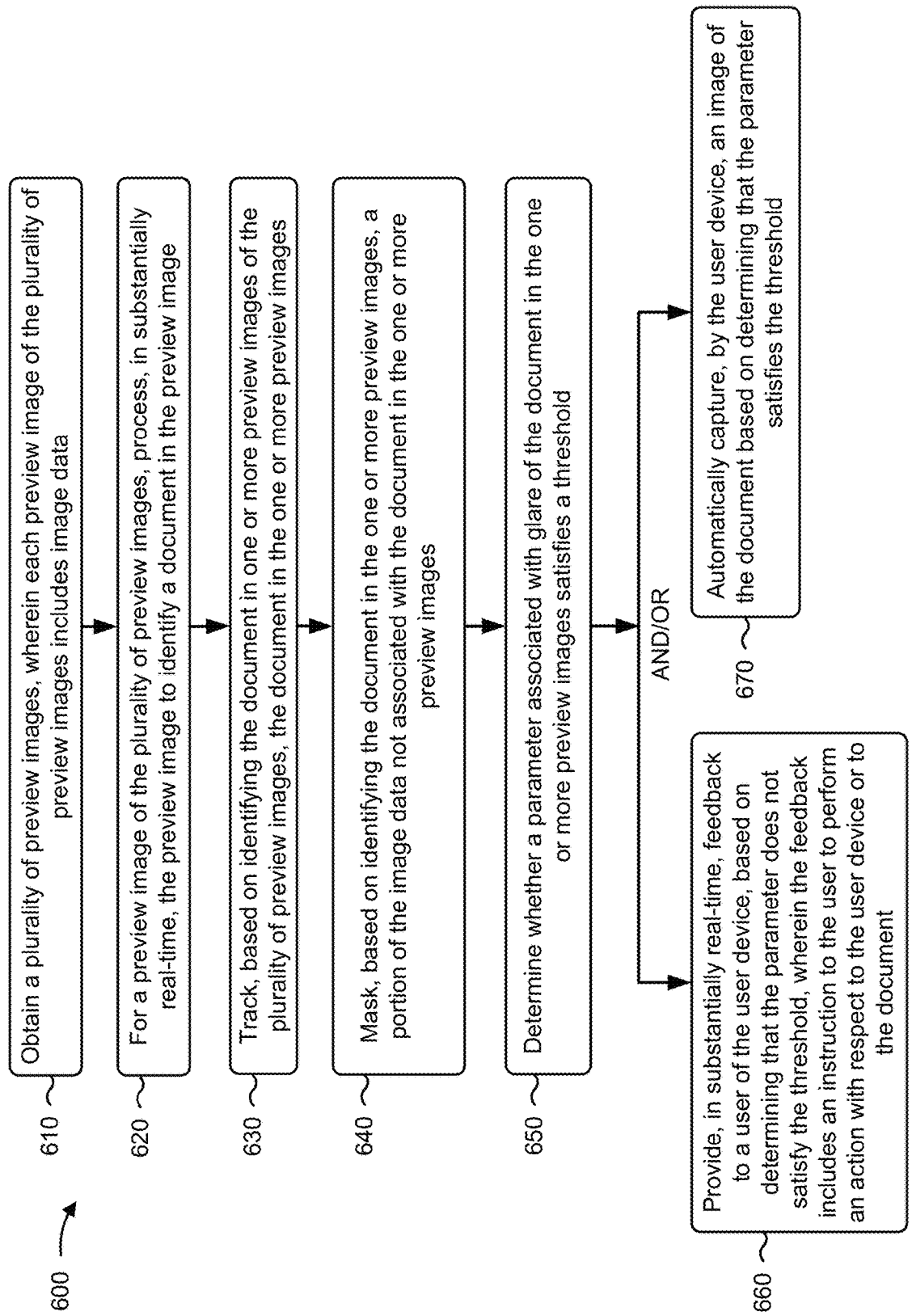

REAL-TIME GLARE DETECTION INSIDE A DYNAMIC REGION OF AN IMAGE

BACKGROUND

A digital image has one or more pixels, wherein the one or more pixels are associated with a value that represents the brightness level of the one or more pixels.

SUMMARY

According to some possible implementations, a method may include capturing, by a user device, a plurality of preview images, wherein each preview image of the plurality of preview images includes image data. The method may include, for a preview image of the plurality of preview images, processing, by the user device in substantially real-time, the preview image to identify an object in the preview image, wherein the processing includes determining an outline of the object. The method may include creating, by the user device and based on determining the outline of the object in one or more preview images of the plurality of preview images, a mask that hides a portion of the image data associated with an area outside of the outline of the object in the one or more preview images. The method may include determining, by the user device, whether a parameter associated with glare of the object in an area inside the outline of the object in the one or more preview images satisfies a threshold. The method may include providing, by the user device in substantially real-time, feedback to a user of the user device, based on determining that the parameter does not satisfy the threshold, wherein the feedback includes an instruction to the user to perform an action with respect to the user device or to the object, and may include automatically capturing, by the user device, an image of the object based on determining that the parameter satisfies the threshold.

According to some possible implementations, a user device may include one or more memories, and one or more processors, communicatively coupled to the one or more memories, to capture a plurality of preview images, wherein each preview image, of the plurality of preview images includes image data. The one or more processors may, for a preview image of the plurality of preview images, process, in substantially real-time, the preview image to identify an object in the preview image. The one or more processors may track, based on identifying the object in one or more preview images of the plurality of preview images, the object in the one or more preview images. The one or more processors may create, based on identifying the object in one or more preview images of the plurality of preview images, a mask that hides a portion of the image data not associated with the object in the one or more preview images. The one or more processors may determine whether a parameter associated with glare of the object in the one or more preview images satisfies a threshold. The one or more processors may provide, in substantially real-time, feedback to a user of the user device, based on determining that the parameter does not satisfy the threshold, wherein the feedback includes an instruction to the user to perform an action with respect to the user device or to the object, and may automatically capture an image of the object based on determining that the parameter satisfies the threshold.

According to some possible implementations, a non-transitory computer-readable medium may store instructions that include one or more instructions that, when executed by one or more processors of a device, cause the one or more processors to obtain a plurality of preview images, wherein each preview image of the plurality of preview images includes image data. The one or more instructions may cause the one or more processors to, for a preview image of the plurality of preview images, process, in substantially real-time, the preview image to identify a document in the preview image. The one or more instructions may cause the one or more processors to track, based on identifying the document in one or more preview images of the plurality of preview images, the document in the one or more preview images. The one or more instructions may cause the one or more processors to mask, based on identifying the document in the one or more preview images, a portion of the image data not associated with the document in the one or more preview images. The one or more instructions may cause the one or more processors to determine whether a parameter associated with glare of the document in the one or more preview images satisfies a threshold. The one or more instructions may cause the one or more processors to provide, in substantially real-time, feedback to a user of the user device, based on determining that the parameter does not satisfy the threshold, wherein the feedback includes an instruction to the user to perform an action with respect to the user device or to the document, and to automatically capture, by the user device, an image of the document based on determining that the parameter satisfies the threshold.

BRIEF DESCRIPTION OF THE DRAWINGS

FIGS. 1A-1E are diagrams of example implementations described herein.

FIG. 5 is a flow chart of an example process for real-time glare detection inside a dynamic region of an image.

FIG. 6 is a flow chart of an example process for real-time glare detection inside a dynamic region of an image.

DETAILED DESCRIPTION

Figure 1A:
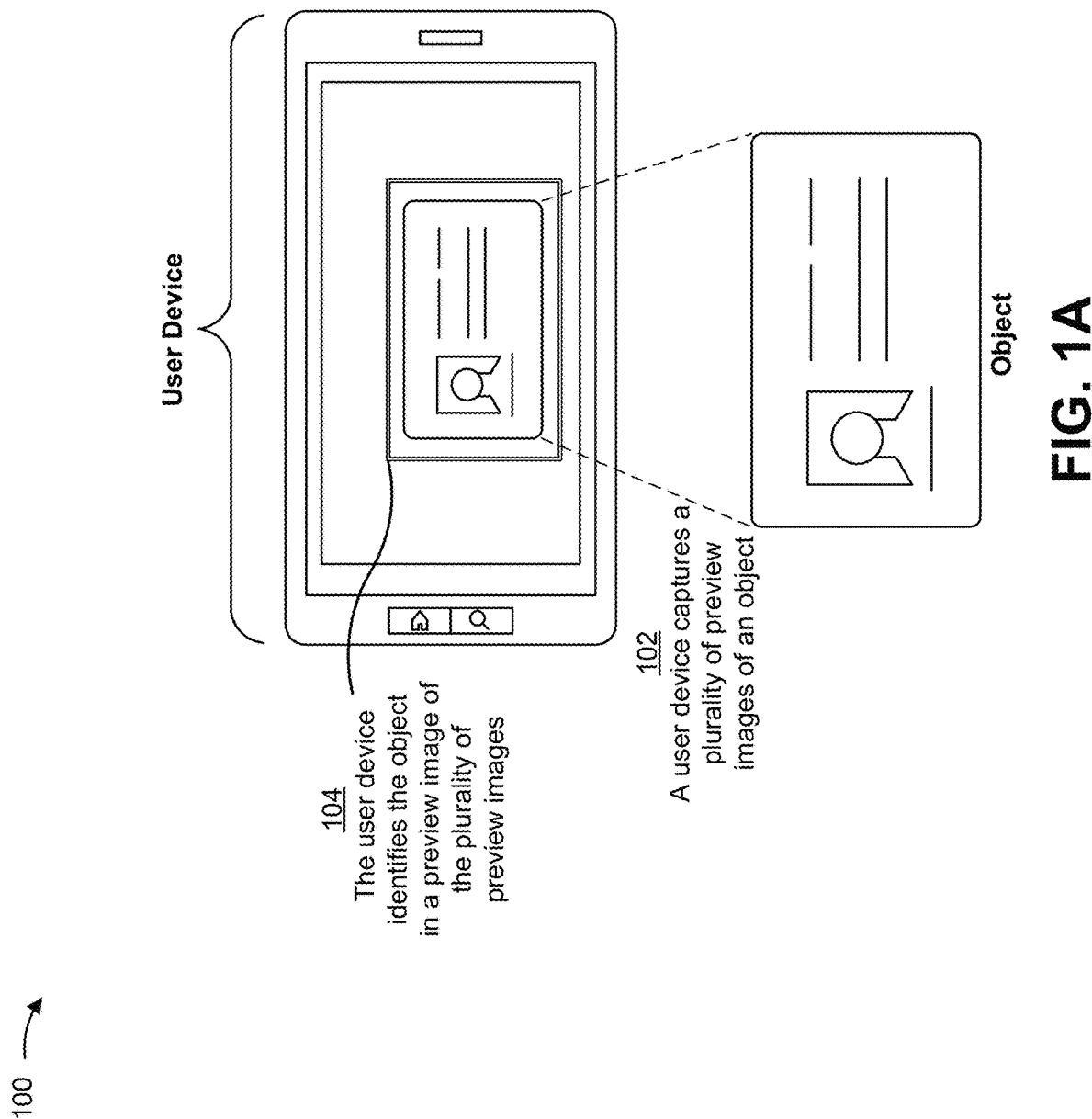

The following detailed description of example implementations refers to the accompanying drawings. The same reference numbers in different drawings may identify the same or similar elements.

Some entities (e.g., financial institutions, such as banks and/or the like) permit account applicants, or customers, to capture images of verification documentation (e.g., government-issued identification (ID) cards and/or the like) using a user device (e.g., a smartphone), and submit the images over the Internet for validation. However, this can often be a frustrating process for a user, particularly if an entity's backend platform repeatedly rejects uploaded images for not meeting image quality standards. Moreover, the uploaded images often include additional image data, such as image data related to a supporting surface for the verification documentation (e.g., a table, countertop, desktop, and/or the like), and the backend platform may reject the uploaded images because the additional image data does not meet the image quality standards, even though the additional image data is irrelevant to the image quality of the verification documentation in the uploaded images.

Some implementations, described herein, provide a user device that is capable of implementing a real-time (or near real-time) image analysis of an object in a plurality of preview images by masking image data not related to the object in the plurality of preview images, which may facilitate capturing an image of the object to meet certain image quality standards regarding glare on the object. In some implementations, the user device may capture a plurality of preview images of an object and the user device may identify the object in the plurality of preview images. In some implementations, the user device may track the object in the plurality of preview images as the user device and/or the object moves while the user device captures the plurality of preview images. In some implementations, the user device may create a mask (e.g., a pixel bit mask) to hide image data not associated with the object in the plurality of preview images. In some implementations, the user device may present, for display, the object in a particular preview image of the plurality of preview images and overlay a visual mask that corresponds to the mask created by the user device. In some implementations, the user device may determine whether there is glare on the object, after creating the mask, based on a brightness level associated with one or more pixels associated with the object (e.g., those pixel values not adjusted by the mask) in the plurality of the preview images. In some implementations, the user device may determine whether there is glare on the object, regardless of whether a mask has been created, based on a brightness level associated with one or more pixels associated with the object (e.g., within an outline or boundary box for the object determined and tracked by the user device) in the plurality of the preview images. In some implementations, the user device may provide feedback to a user of the user device regarding how to reduce the glare on the object and may automatically capture an image of the object when the glare on the object is minimized. In some implementations, the user device may send the image to a server device for processing (e.g., validation of the object in the image).

In this way, the user device optimizes real-time glare detection inside a dynamic region of an image. In this way, the user device processes only image data related to the object in the plurality of preview frames to detect glare. This conserves computing resources, power resources, and memory resources of the user device that would otherwise need to be expended to process all the image data in the plurality of preview frames. Moreover, masking the image data not associated with the object in the plurality of preview images ensures that the user device (e.g., via an application executing on the user device) performs preview image analysis for glare on the object and not with respect to image data not associated with the object. In this way, the user device may guide a user in the image capturing process via real-time (or near real-time) feedback, and ensure that only high-quality images of the object (e.g., images with little-to-no glare on the object) are ultimately captured (and, for example, uploaded to a backend platform for validation). This shortens, and simplifies, the image capturing process, which conserves computing resources, power resources, and memory resources of the user device that would otherwise need to be expended in cases where low-quality images are repeatedly captured. In addition, this conserves computing resources, memory resources, and network resources, associated with a backend platform, that would otherwise need to be expended to receive and process such low-quality images.

FIGS. 1A-1E are diagrams of example implementations 100 described herein. Example implementation 100 may include a user device (e.g., a mobile device, such as a smartphone and/or the like) and an object, such as a document (e.g., a document that indicates identification information, a government-issued identification (ID) card, an employee ID card, a health insurance card, a transaction card (e.g., a credit card, a debit card, an automated teller machine (ATM) card, and/or the like), a check, and/or the like). In some implementations, the user device may include a camera (e.g., one or more cameras) configured to capture images, and one or more applications (e.g., provided by, or associated with, an entity, such as a financial institution (e.g., a bank and/or the like)) capable of facilitating image capturing. In some implementations, the user may activate the one or more applications on the user device to capture an image of the object.

In some implementations, the camera of the user device may support one or more image resolutions. In some implementations, an image resolution may be represented as a number of pixel columns (width) and a number of pixel rows (height), such as 1280×720, 1920×1080, 2592×1458, 3840×2160, 4128×2322, 5248×2952, 5312×2988, and/or the like, where higher numbers of pixel columns and higher numbers of pixel rows are associated with higher image resolutions. In some implementations, the camera may support a first image resolution that is associated with a quick capture mode, such as a low image resolution for capturing and displaying low-detail preview images on a display of the user device. In some implementations, the camera may support a second image resolution that is associated with a full capture mode, such as a high image resolution for capturing a high-detail image. In some implementations, the full capture mode may be associated with the highest image resolution supported by the camera.

As shown in FIG. 1A, and by reference number 102, the user device (e.g., via an application executing on the user device) captures a plurality of preview images of an object. In some implementations, the one or more applications may instruct a user to position the user device over the object for the user device to capture the plurality of preview images of the object. In some implementations, the user may point the camera of the user device at the object and the camera of the user device may capture the plurality of preview images of the object. In some implementations, the user device may capture the plurality of preview images using the quick capture mode. In some implementations, the user device may cause a display of the user device to display a preview image of the plurality of preview images as the user device captures the preview image (e.g., in real-time (or near real-time)).

In some implementations, the preview image of the plurality of preview images includes image data (e.g., data concerning the object, other objects, text, images, contrast of the preview image, brightness of the preview image, a luminance channel of the preview image, a file type of the preview image, and/or the like). In some implementations, the preview image may include one or more pixels and the image data of the preview image may include a pixel intensity value, a pixel brightness level value, a luminance value, and/or the like associated with a pixel of the one or more pixels (e.g., a value that represents a brightness level of the one or more pixels). In some implementations, a low pixel intensity value, a low pixel brightness value, a low luminance value, and/or the like may be associated with a low brightness level of a pixel (e.g., a pixel that is not bright, a pixel that is dark, a pixel that is black, and/or the like) and a high pixel intensity value, a high pixel brightness value, a high luminance value, and/or the like may be associated with a high brightness level of a pixel (e.g., a pixel that is bright, a pixel that is not dark, a pixel that is white, and/or the like).

As shown by reference number 104, the user device (e.g., via an application executing on the user device) identifies the object in the preview image of the plurality of preview images. In some implementations, the user device may detect the object in the preview image as the user device captures the preview image (e.g., in real-time (or near real-time)). In some implementations, the user device may process the preview image as the user device captures the preview image (e.g., in real-time (or near real-time)) to identify the object in the preview image. In some implementations, processing the preview image may include determining one or more elements concerning the object, such as an outline of the object, a boundary outline of the object, a bounding box of the object, a bounding rectangle of the object, a bounding polygon of the object, a shape around the object, and/or the like. In some implementations, the user device may cause display of the one or more elements concerning the object as an overlay (e.g., an augmented reality overlay) on the preview image (e.g., in real-time (or near real-time)). For example, the user device may cause display of a rectangular shape around a government issued ID card.

Figure 1B:
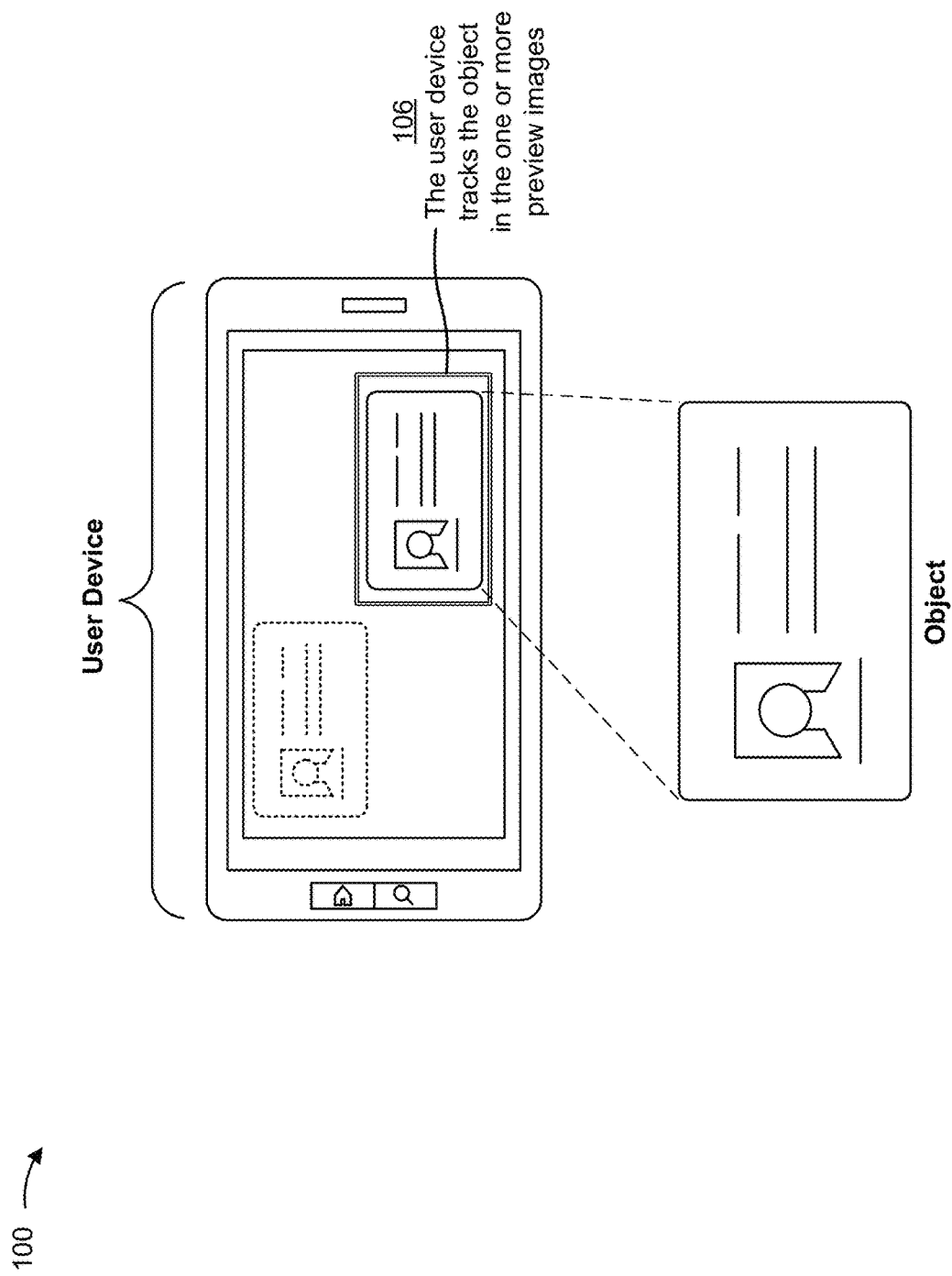

As shown in FIG. 1B and by reference number 106, the user device (e.g., via an application executing on the user device) may track the object in the plurality of preview images. For example, the user device may track a position of the object, a size of the object, and/or an orientation of the object as the object and/or the user device moves while the user device captures the plurality of preview images. In some implementations, the user device may continuously and/or periodically determine the one or more elements concerning the object based on tracking the object (e.g., the user device updates the outline of the object, the boundary outline of the object, the bounding box of the object, the bounding rectangle of the object, the bounding polygon of the object, the shape around the object, and/or the like).

Figure 1C:
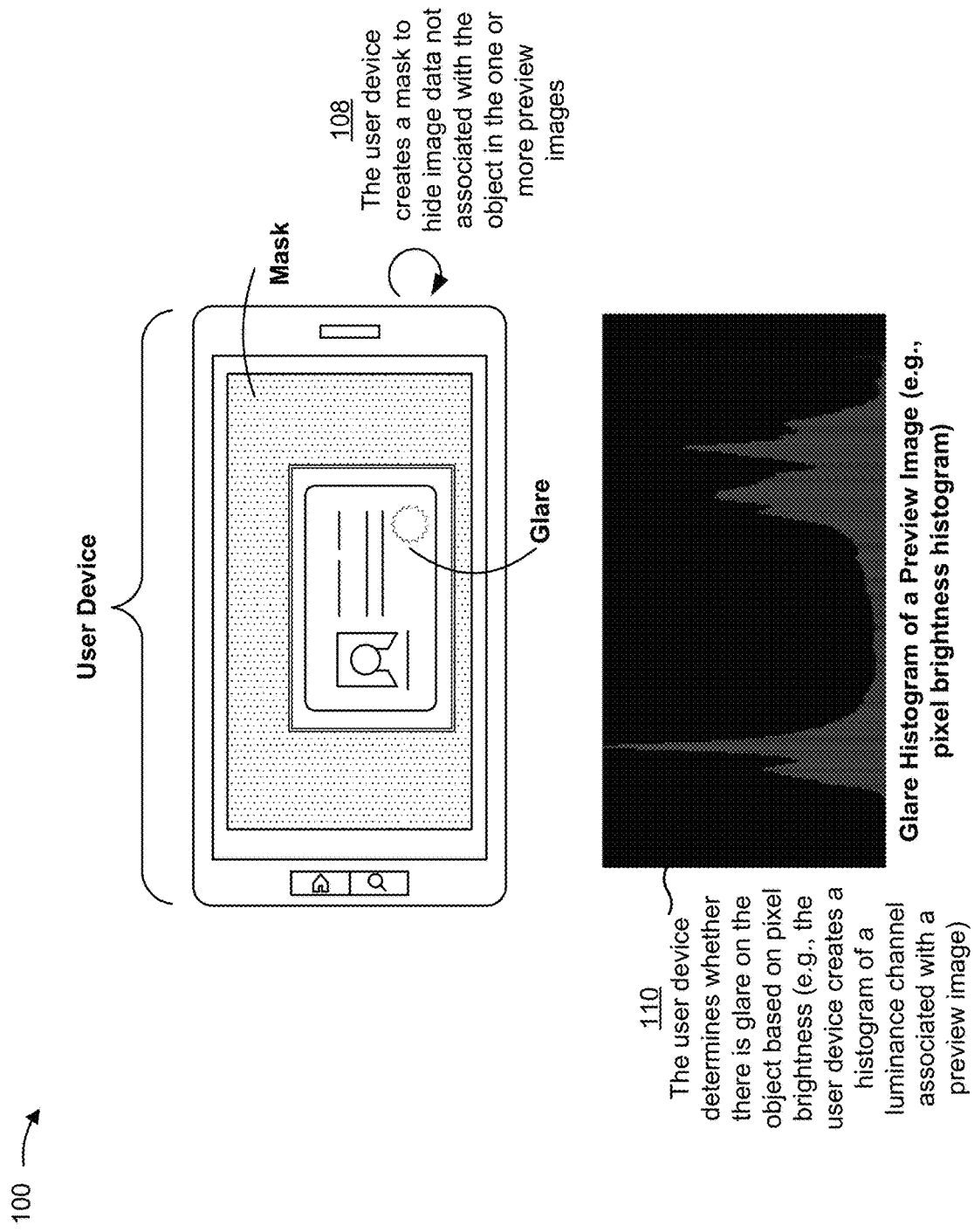

As shown in FIG. 1C and by reference number 108, the user device (e.g., via an application executing on the user device) creates a mask to hide and/or mask a portion of the image data not associated with the object in the plurality of preview images (e.g., the user device ignores the image data not associated with the object). In some implementations, the user device may create the mask based on the one or more elements concerning the object. For example, the user device may create the mask to hide and/or mask a portion of the image data associated with an area outside of the one or more elements, such as the outline of the object, in the plurality of preview images. In some implementations, the user device creates the mask by setting, assigning, and/or changing the pixel intensity value, the pixel brightness value, the luminance value, and/or the like, for each pixel associated with the portion of the image data. For example, the user device may set, assign, and/or change the pixel intensity value, the pixel brightness value, the luminance value, and/or the like, for each pixel associated with the portion of the image data to zero (e.g., the user device sets each pixel to be dark, assigns each pixel to have the lowest brightness level, changes each pixel to be black, and/or the like).

In some implementations, the user device may present, for display, a particular preview image of the plurality of preview images after creating the mask. In some implementations, the user device may present an overlay, for display on the particular preview image, a visual mask that corresponds to the mask that hides the portion of the image data associated with the area outside of the outline of the object in the plurality of preview images. In some implementations, the visual mask obscures the portion of the image data associated with the area outside of the outline of the object in the plurality of preview images when the plurality of preview images are displayed. In this way, the user device may aid a user of the user device to frame the object in a field of view of the camera of the user device, focus the camera on the object, capture a high-quality image of the object (e.g., an image with little-to-no glare on the object), and/or the like.

As shown by reference number 110, the user device (e.g., via an application executing on the user device) determines whether there is glare on the object in the plurality of preview images. In some implementations, the user device may determine whether there is glare on the object in the plurality of preview images based on identifying the object, tracking the object, and/or creating the mask. In some implementations, the user device may determine whether a parameter, such as a parameter associated with glare of the object in the plurality of preview images, satisfies a threshold (e.g., the user device determines whether the object has at least a minimum amount of glare). In some implementations, the parameter is related to the brightness level of one or more pixels of the object in the plurality of preview images. In some implementations, the user device may process the plurality of preview images to determine the parameter.

For example, the user device, when processing the plurality of preview images, may determine, for a particular preview image of the one or more preview images, a glare value that indicates a percentage of the image data associated with the particular preview image that has glare (e.g., a percentage of the one or more pixels of the particular preview image that have a high pixel intensity value, a high pixel brightness value, a high luminance value, and/or the like). The user device then may calculate an average glare value of the plurality of preview images, based on the glare value of a set of preview images of the plurality of preview images (e.g., a representative sample of the plurality of preview images), and assign the parameter a value that indicates the average glare value. The user device may then determine whether the parameter that indicates the average glare value satisfies the threshold. In some embodiments, the glare value may be determined based on those pixel values determined to be associated with the object (e.g., within an outline or boundary box determined and tracked for the object).

As another example, the user device may process a set of preview images of the plurality of preview images (e.g., a representative sample of the plurality of preview images). The user device may create, for a particular preview image of the set or preview images, a histogram concerning brightness of the one or more pixels of the particular preview image. In some implementations, the user device may create a histogram of the luminance channel associated with the image data of the particular preview image, a histogram of the pixel intensity value associated with the one or more pixels of the preview image, a histogram of the pixel brightness level value associated with the one or more pixels of the preview image, a histogram of the luminance value associated with the one or more pixels of the preview image, and/or the like. The user device may determine a percentage of bright pixels associated with the particular preview image based on the histogram (e.g., a percentage of pixels with a brightness level associated with glare, such as a percentage of pixels with brightness level at or above 98% of the maximum brightness level). The user device then may determine whether an average percentage of bright pixels associated with the set of preview images satisfy the threshold.

Figure 1D:
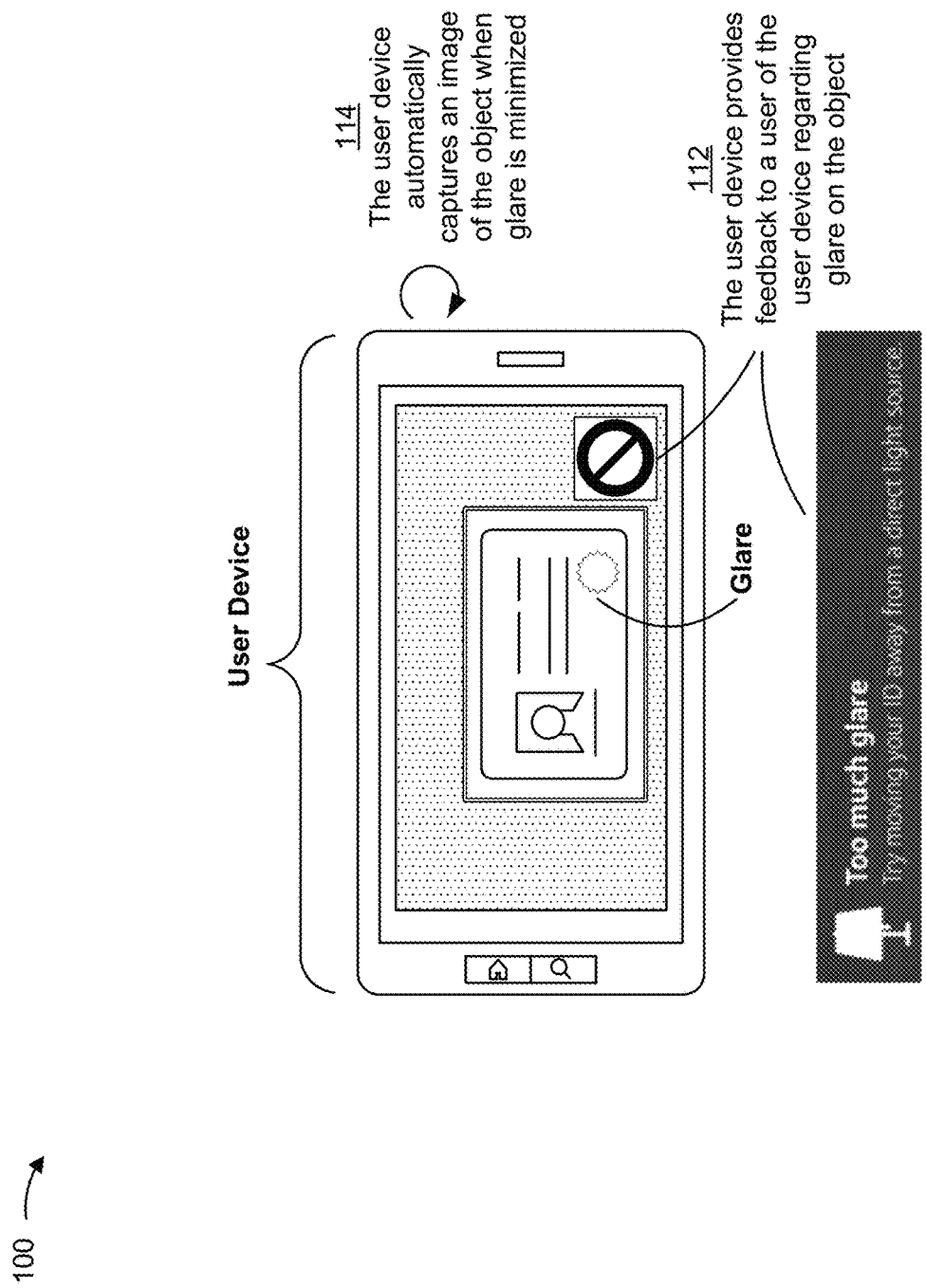

As shown in FIG. 1D and by reference number 112, the user device (e.g., via an application executing on the user device) provides feedback to a user of the user device regarding glare on the object. In some implementations, the user device may provide feedback to the user of the user device as the user device captures the plurality of preview images (e.g., in real-time, or near real-time). In some implementations, the user device may provide feedback to the user based on determining that the parameter does not satisfy the threshold (e.g., based on determining that too much glare exists on the object, too much glare exists in the plurality of preview images, and/or the like). In some implementations, the feedback includes an instruction to the user to perform an action with respect to the user device and/or to the object. For example, the feedback may include an instruction on how to reduce glare (e.g., by moving the object and/or user device away from a light source, angling the object and/or user device away from a light source, changing the position of the object and/or user device, changing the orientation of the object and/or user device, and/or the like). In some implementations, the feedback may include a continuous and/or periodic instruction on how to reduce glare until the parameter satisfies the threshold. In some implementations, the feedback may include a message indicating that an image cannot be captured based on determining that the parameter does not satisfy the threshold (e.g., because of too much glare on the object). For example, the user device may cause display of a message on a display of the user device indicating that there is too much glare on the object to automatically capture the image of the object.

In some implementations, the user device may perform an action to reduce or eliminate the glare on the object. In some implementations, the action may include altering a function of the user device. For example, the user device may cause the intensity of a flash from the user device to be reduced. By way of example, assume that the user has set a flash of the user device to flash at the highest intensity whenever the user device captures an image. In such a situation, the user device may cause the intensity of flash to be reduced or may turn the flash off when capturing the image of the object.

In some implementations, the action may include causing another device to perform a function. For example, the user device may cause the lighting, in the room in which the user device and object are located, to be reduced or turned off. As another example, the user device may cause a window covering, in the room in which the user device and object are located, to change configuration to reduce the amount of ambient light in the room. In some implementations, the user device may control other connected devices in a home or office to cause the glare on the object to be reduced or eliminated.

As shown by reference number 114, the user device (e.g., via an application executing on the user device) automatically captures an image of the object when glare on the object is minimized (e.g. is below a threshold). In some implementations, the user device may automatically capture an image of the object based on determining that the parameter satisfies the threshold (e.g., little-to-no glare exists on the object). For example, the user device may automatically capture an image of the object in a full capture mode (e.g., a high resolution image) based on determining that the parameter satisfies the threshold.

In some implementations, the user device may determine whether the image of the object, after automatically capturing the image, has too much glare. For example, the user device may determine, after automatically capturing the image, whether an additional parameter, associated with glare of the object in the image, satisfies the threshold. In some implementations, the user device may automatically crop the object in the image after determining that the additional parameter, associated with glare of the object in the image, satisfies the threshold (e.g., the user device may crop the object after determining that little-to-no glare exists on the object). For example, the user device may crop the object in the image around the outline of the object.

As shown in FIG. 1E and by reference number 116: the user device (e.g., via an application executing on the user device) may send the image to a server device (e.g., the user device may upload the image to an image verification server). As shown by reference number 118, the server device may process the image (e.g., the image verification server may verify the image). For example, the server device may use a computer vision technique to extract data from the image and verify that the data is accurate by comparing the data and image-related information from a database. As shown by reference number 120, the server device may send a message to the user device regarding the image (e.g., the image verification server may send a message to the user device regarding verification of the image). For example, the server device may send a message to the user device indicating that the data extracted from the image is accurate. As shown by reference number 122, the user device (e.g., via an application executing on the user device) may receive the message and cause display of information regarding the message on the display of the user device (e.g., the user device may present, for display, information indicating whether the image has been verified).

In this way, the user device optimizes real-time glare detection inside a dynamic region of an image, and processes only image data related to the object in the plurality of preview frames to detect glare. This conserves computing resources, power resources, and memory resources of the user device that would otherwise need to be expended to process all the image data in the plurality of preview frames. Moreover, masking the image data not associated with the object in the plurality of preview images ensures that the user device just detects glare on the object. In this way, the user device may guide a user in the image capturing process via real-time (or near real-time) feedback, and ensure that only high-quality images of the object (e.g., images with little-to-no glare on the object) are ultimately captured (and, for example, uploaded to a backend platform for validation). This shortens, and simplifies, the image capturing process, which conserves computing resources, power resources, and memory resources of the user device that would otherwise need to be expended in cases where low-quality images are repeatedly captured. In addition, this conserves computing resources, memory resources, and network resources, associated with a backend platform, that would otherwise need to be expended to receive and process such low-quality images.

As indicated above, FIGS. 1A-1E are provided merely as examples. Other examples are possible and may differ from what was described with regard to FIGS. 1A-1E.

Figure 2:
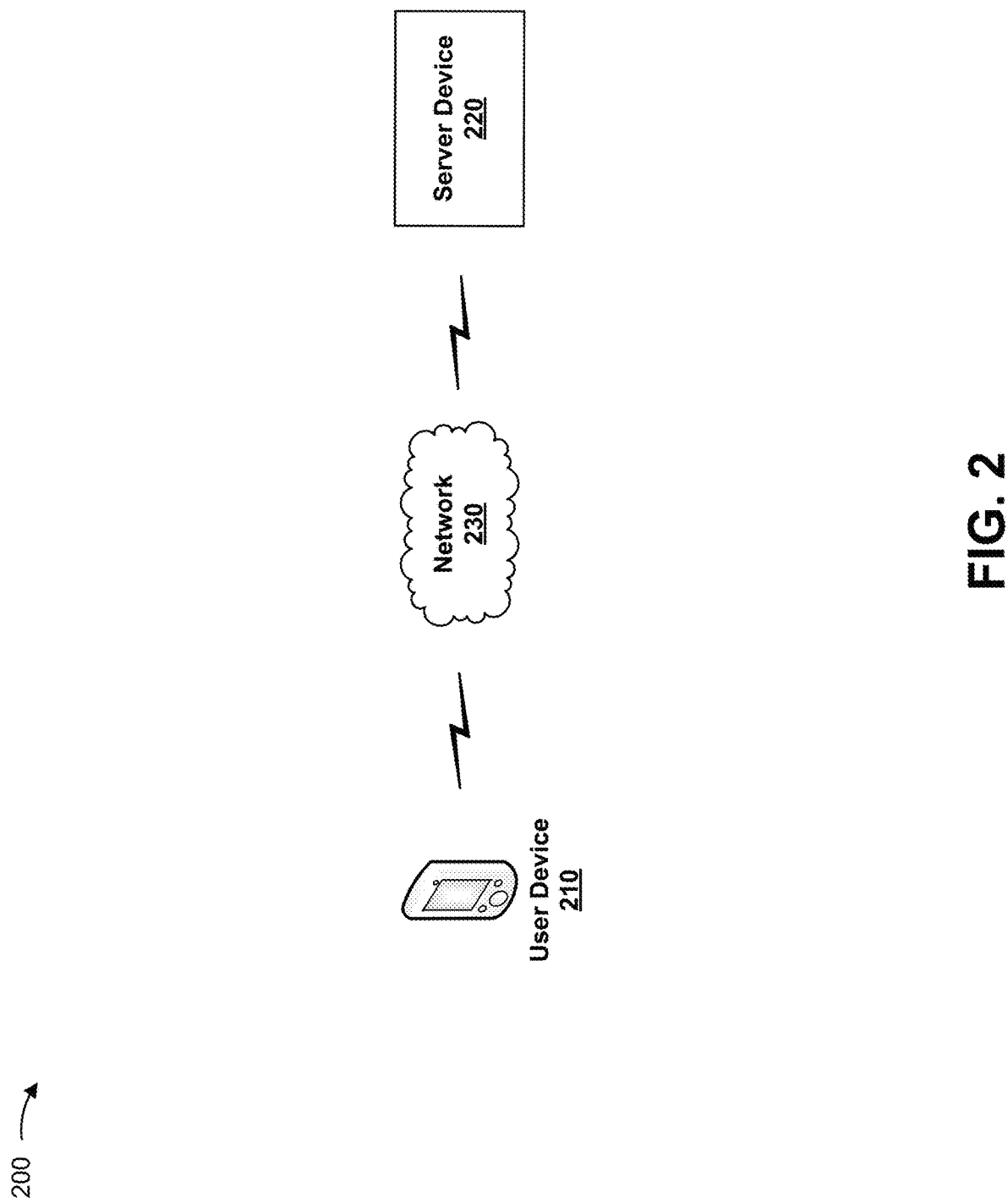
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a server device 220, and a network 230. Devices of environment 200 may interconnect via wired connections, wireless connections, or a combination of wired and wireless connections.

User device 210 includes one or more devices capable of receiving, generating, storing, processing, and/or providing information associated with dynamically optimizing photo capture for multiple subjects. For example, user device 210 may include a device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. User device 210 may include a camera, and may capture an image (e.g., of a document) using the camera. In some implementations, user device 210 may send the captured image, via network 230, to server device 220 for processing the captured image. In some implementations, user device 210 may receive a message from server device 220 and may display the message.

In some implementations, user device 210 may capture a plurality of preview images of an object. In some implementations, user device 210 may identify the object in a preview image of the object. In some implementations, user device 210 may track the object in one or more preview images. In some implementations, user device 210 may create a mask to hide image data not associated with the object in one or more preview images. In some implementations, user device 210 may determine whether there is glare on the object (e.g., based on pixel brightness). In some implementations, user device 210 may provide feedback to a user of user device 210 regarding glare on the object. In some implementations, user device 210 may automatically capture an image of the object when glare is minimized. In some implementations, user device 210 may send the image to server device 220. In some implementations, user device 210 may display information regarding a message (e.g., regarding verification of the image) on a display of user device 210.

Server device 220 includes one or more devices capable of receiving, generating, storing, processing, and/or providing information associated with dynamically optimizing photo capture for multiple subjects. For example, server device 220 may include a server device (e.g., a host server, a web server, an application server, etc.), a data center device, or a similar device, capable of communicating with user device 210 via network 230. In some implementations, server device 220 may receive, from user device 210, an image captured by user device 210, and may process the image. In some implementations, server device 220 may send, to user device 210 via network 230, a message based on processing an image. In some implementations, server device 220 may receive an image from user device 210. In some implementations, server device 220 may process the image (e.g., to verify the image). In some implementations, server device 220 may send a message to user device 210 regarding the image (e.g., regarding verification of the image).

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
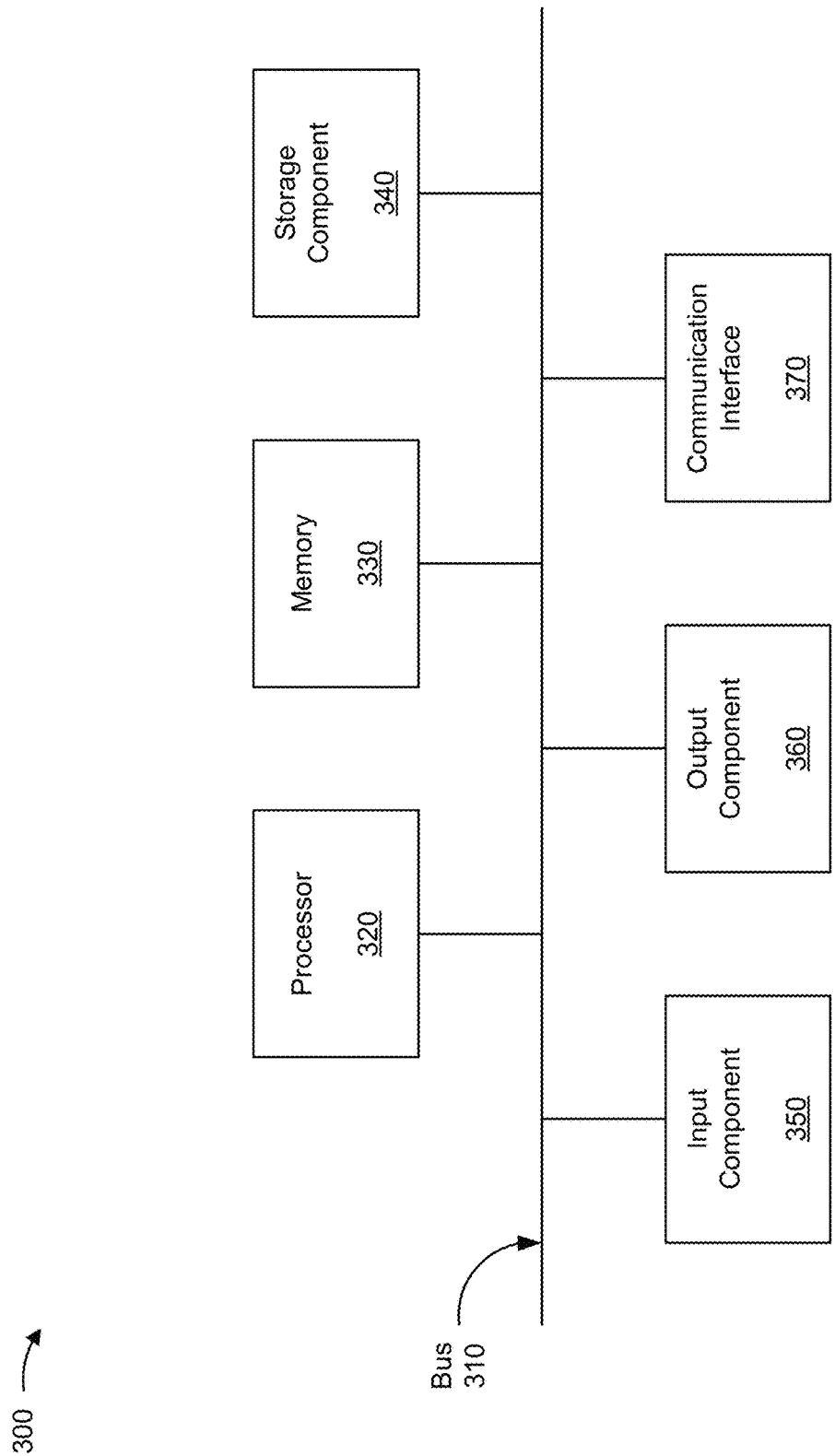
FIG. 3 is a diagram of example components of one or more devices of FIG. 2.

FIG. 3 is a diagram of example components of a device 300. Device 300 may correspond to user device 210 and/or server device 220. In some implementations, user device 210 and/or server device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
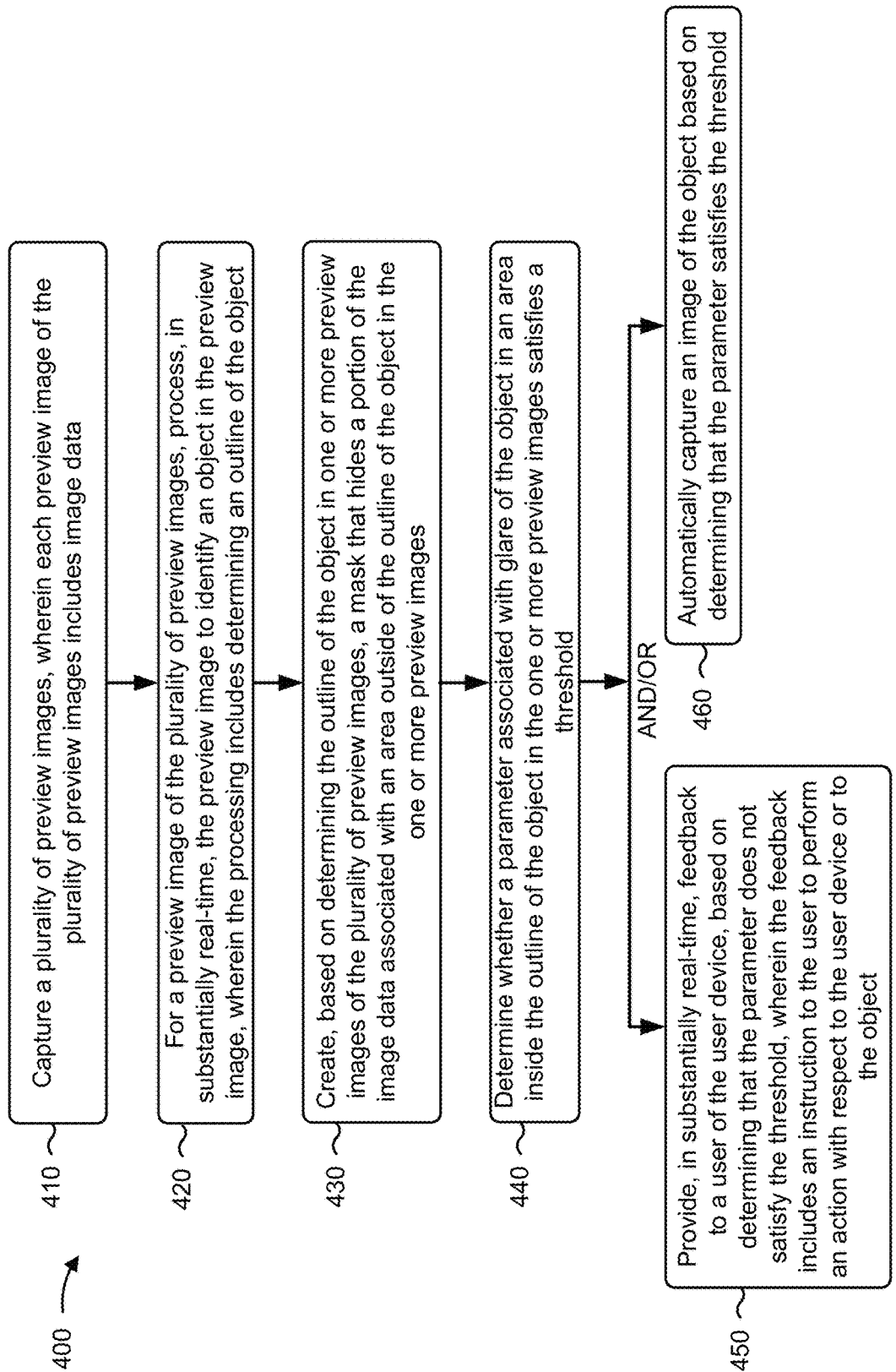
FIG. 4 is a flow chart of an example process for real-time glare detection inside a dynamic region of an image.

FIG. 4 is a flow chart of an example process 400 for real-time glare detection inside a dynamic region of an image. In some implementations, one or more process blocks of FIG. 4 may be performed by a user device (e.g., user device 210). In some implementations, one or more process blocks of FIG. 4 may be performed by another device or a group of devices separate from or including the user device, such as a server device (e.g., server device 220).

As shown in FIG. 4, process 400 may include capturing a plurality of preview images, wherein each preview image of the plurality of preview images includes image data (block 410). For example, the user device (e.g., using processor 320, memory 330, storage component 340, input component 350, communication interface 370, and/or the like) may capture a plurality of preview images, as described above in connection with FIGS. 1A-1E. In some implementations, each preview image of the plurality of preview images may include image data.

As further shown in FIG. 4, process 400 may include for a preview image of the plurality of preview images, processing, in substantially real-time, the preview image to identify an object in the preview image, wherein the processing includes determining an outline of the object (block 420). For example, the user device (e.g., using processor 320, memory 330, storage component 340, and/or the like) may process, in substantially real-time, the preview image to identify an object in the preview image, as described above in connection with FIGS. 1A-1E. In some implementations, the processing may include determining an outline of the object.

As further shown in FIG. 4, process 400 may include creating, based on determining the outline of the object in one or more preview images of the plurality of preview images, a mask that hides a portion of the image data associated with an area outside of the outline of the object in the one or more preview images (block 430). For example, the user device (e.g., using processor 320, memory 330, storage component 340, and/or the like) may create, based on determining the outline of the object in one or more preview images of the plurality of preview images, a mask that hides a portion of the image data associated with an area outside of the outline of the object in the one or more preview images, as described above in connection with FIGS. 1A-1E.

As further shown in FIG. 4, process 400 may include determining whether a parameter associated with glare of the object in an area inside the outline of the object in the one or more preview images satisfies a threshold (block 440). For example, the user device (e.g., using processor 320, memory 330, storage component 340, and/or the like) may determine whether a parameter associated with glare of the object in an area inside the outline of the object in the one or more preview images satisfies a threshold, as described above in connection with FIGS. 1A-1E.

As further shown in FIG. 4, process 400 may include providing, by the user device in substantially real-time, feedback to a user of the user device, based on determining that the parameter does not satisfy the threshold, wherein the feedback includes an instruction to the user to perform an action with respect to the user device or to the object (block 450). For example, the user device (e.g., using processor 320, memory 330, storage component 340, output component 360, communication interface 370, and/or the like) may provide, in substantially real-time, feedback to a user of the user device, based on determining that the parameter does not satisfy the threshold, as described above in connection with FIGS. 1A-1E. In some implementations, the feedback may include an instruction to the user to perform an action with respect to the user device or to the object.

As further shown in FIG. 4, process 400 may include automatically capturing an image of the object based on determining that the parameter satisfies the threshold (block 460). For example, the user device (e.g., using processor 320, memory 330, storage component 340, input component 350, communication interface 370, and/or the like) may automatically capture an image of the object based on determining that the parameter satisfies the threshold, as described above in connection with FIGS. 1A-1E.

Process 400 may include additional implementations, such as any single implementation or any combination of implementations described below and/or in connection with one or more other processes described elsewhere herein.

In some implementations, when creating, based on determining the outline of the object in the one or more preview images of the plurality of preview images, the mask that hides the portion of the image data associated with the area outside of the outline of the object in the one or more preview images, the user device may set a pixel intensity value, of the image data associated with the area outside of the outline of the object in the one or more preview images, to zero.

In some implementations, when determining whether the parameter, associated with glare of the object in the one or more preview images, satisfies the threshold, the user device may process the one or more preview images to determine the parameter. In some implementations, when processing the one or more preview images to determine the parameter, the user device may determine, for each preview image of the one or more preview images, a glare value that indicates a percentage of the image data in an area inside the outline of the object associated with the respective preview image that has glare. In some implementations, when processing the one or more preview images to determine the parameter, the user device may calculate an average glare value of the one or more preview images based on the glare value of a set of preview images of the one or more preview images. In some implementations, when processing the one or more preview images to determine the parameter, the user device may assign the parameter a value that indicates the average glare value.

In some implementations, the user device may present, for display, a particular preview image of the one or more preview images, and may overlay, on the particular preview image, a visual mask that corresponds to the mask that hides the portion of the image data associated with the area outside of the outline of the object in the one or more preview images.

In some implementations, the user device may determine, after automatically capturing the image whether an additional parameter associated with glare of the object in an area inside the outline of the object in the image satisfies the threshold and may automatically crop the object in the image after determining that the additional parameter, associated with glare of the object in the image, satisfies the threshold. In some implementations, when automatically cropping the object in an area inside the outline of the object in the image after determining that the additional parameter associated with glare of the object in the image satisfies the threshold, the user device may crop the object in the image around the outline of the object. In some implementations, the object may be a document.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for real-time glare detection inside a dynamic region of an image. In some implementations, one or more process blocks of FIG. 5 may be performed by a user device (e.g., user device 210). In some implementations, one or more process blocks of FIG. 5 may be performed by another device or a group of devices separate from or including the user device, such as a server device (e.g., server device 220).

As shown in FIG. 5, process 500 may include capturing a plurality of preview images, wherein each preview image of the plurality of preview images includes image data (block 510). For example, the user device (e.g., using processor 320, memory 330, storage component 340, input component 350, communication interface 370, and/or the like) may capture a plurality of preview images, as described above in connection with FIGS. 1A-1E. In some implementations, each preview image, of the plurality of preview images, may include image data.

As further shown in FIG. 5, process 500 may include, for a preview image of the plurality of preview images, processing, in substantially real-time, the preview image to identify an object in the preview image (block 520). For example, the user device (e.g., using processor 320, memory 330, storage component 340, and/or the like) may, for a preview image of the plurality of preview images, process, in substantially real-time, the preview image to identify an object in the preview image, as described above in connection with FIGS. 1A-1E.

As further shown in FIG. 5, process 500 may include tracking, based on identifying the object in one or more preview images of the plurality of preview images, the object in the one or more preview images (block 530). For example, the user device (e.g., using processor 320, memory 330, storage component 340, and/or the like) may track, based on identifying the object in one or more preview images of the plurality of preview images, the object in the one or more preview images, as described above in connection with FIGS. 1A-1E.

As further shown in FIG. 5, process 500 may include creating, based on identifying the object in one or more preview images of the plurality of preview images, a mask that hides a portion of the image data not associated with the object in the one or more preview images (block 540). For example, the user device (e.g., using processor 320, memory 330, storage component 340, and/or the like) may create, based on identifying the object in one or more preview images of the plurality of preview images, a mask that hides a portion of the image data not associated with the object in the one or more preview images, as described above in connection with FIGS. 1A-1E.

As further shown in FIG. 5, process 500 may include determining whether a parameter associated with glare of the object in the one or more preview images satisfies a threshold (block 550). For example, the user device (e.g., using processor 320, memory 330, storage component 340, and/or the like) may determine whether a parameter associated with glare of the object in the one or more preview images satisfies a threshold, as described above in connection with FIGS. 1A-1E.

As further shown in FIG. 5, process 500 may include providing, in substantially real-time, feedback to a user of the user device, based on determining that the parameter does not satisfy the threshold, wherein the feedback includes an instruction to the user to perform an action with respect to the user device or to the object (block 560). For example, the user device (e.g., using processor 320, memory 330, storage component 340, output component 360, communication interface 370, and/or the like) may provide, in substantially real-time, feedback to a user of the user device, based on determining that the parameter does not satisfy the threshold, as described above in connection with FIGS. 1A-1E. In some implementations, the feedback may include an instruction to the user to perform an action with respect to the user device or to the object.

As further shown in FIG. 5, process 500 may include automatically capturing an image of the object based on determining that the parameter satisfies the threshold (block 570). For example, the user device (e.g., using processor 320, memory 330, storage component 340, input component 350, communication interface 370, and/or the like) may automatically capture an image of the object based on determining that the parameter satisfies the threshold, as described above in connection with FIGS. 1A-1E.

Process 500 may include additional implementations, such as any single implementation or any combination of implementations described below and/or in connection with one or more other processes described elsewhere herein.

In some implementations, when providing, in substantially real-time, feedback to the user of the user device, based on determining that the parameter does not satisfy the threshold, the user device may cause display of a message on a display of the user device indicating that there is too much glare on the object to automatically capture the image of the object.

In some implementations, the instruction may be to move the object or the user device away from a light source. In some implementations, the instruction may be to angle the object away from a light source. In some implementations, when tracking the object in the one or more preview images, the user device may track a position of the object, a size of the object, and/or an orientation of the object.

In some implementations, when determining whether the parameter associated with glare of the object in the one or more preview images satisfies the threshold, the user device may process a set of preview images of the one or more preview images. In some implementations, when processing a particular preview image of the set of preview images, the user device may create a histogram of a luminance channel associated with the image data of the particular preview image, and may determine a percentage of bright pixels associated with the particular preview image based on the histogram. In some implementations, the user device may determine whether an average percentage of bright pixels associated with the set of preview images satisfy the threshold. In some implementations, the object may be a document that indicates identification information.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for real-time glare detection inside a dynamic region of an image. In some implementations, one or more process blocks of FIG. 6 may be performed by a user device (e.g., user device 210). In some implementations, one or more process blocks of FIG. 6 may be performed by another device or a group of devices separate from or including the user device, such as a server device (e.g., server device 220).

As shown in FIG. 6, process 600 may include obtaining a plurality of preview images, wherein each preview image of the plurality of preview images includes image data (block 610). For example, the user device (e.g., using processor 320, memory 330, storage component 340, input component 350, communication interface 370, and/or the like) may obtain a plurality of preview images, as described above in connection with FIGS. 1A-1E. In some implementations, each preview image of the plurality of preview images may include image data.

As further shown in FIG. 6, process 600 may include, for a preview image of the plurality of preview images, processing, in substantially real-time, the preview image to identify a document in the preview image (block 620). For example, the user device (e.g., using processor 320, memory 330, storage component 340, and/or the like) may, for a preview image of the plurality of preview images, process, in substantially real-time, the preview image to identify a document in the preview image, as described above in connection with FIGS. 1A-1E.

As further shown in FIG. 6, process 600 may include tracking, based on identifying the document in one or more preview images of the plurality of preview images, the document in the one or more preview images (block 630). For example, the user device (e.g., using processor 320, memory 330, storage component 340, and/or the like) may track, based on identifying the document in one or more preview images of the plurality of preview images, the document in the one or more preview images, as described above in connection with FIGS. 1A-1E.

As further shown in FIG. 6, process 600 may include masking, based on identifying the document in the one or more preview images, a portion of the image data not associated with the document in the one or more preview images (block 640). For example, the user device (e.g., using processor 320, memory 330, storage component 340, and/or the like) may mask, based on identifying the document in the one or more preview images, a portion of the image data not associated with the document in the one or more preview images, as described above in connection with FIGS. 1A-1E.

As further shown in FIG. 6, process 600 may include determining whether a parameter associated with glare of the document in the one or more preview images satisfies a threshold (block 650). For example, the user device (e.g., using processor 320, memory 330, storage component 340, and/or the like) may determine whether a parameter associated with glare of the document in the one or more preview images satisfies a threshold, as described above in connection with FIGS. 1A-1E.

As further shown in FIG. 6, process 600 may include providing, in substantially real-time, feedback to a user of the user device, based on determining that the parameter does not satisfy the threshold, wherein the feedback includes an instruction to the user to perform an action with respect to the user device or to the document (block 660). For example, the user device (e.g., using processor 320, memory 330, storage component 340, output component 360, communication interface 370, and/or the like) may provide, in substantially real-time, feedback to a user of the user device, based on determining that the parameter does not satisfy the threshold, as described above in connection with FIGS. 1A-1E. In some implementations, the feedback may include an instruction to the user to perform an action with respect to the user device or to the document.

As further shown in FIG. 6, process 600 may include automatically capturing, by the user device, an image of the document based on determining that the parameter satisfies the threshold (block 670). For example, the user device (e.g., using processor 320, memory 330, storage component 340, input component 350, communication interface 370, and/or the like) may automatically capture, by the user device, an image of the document based on determining that the parameter satisfies the threshold, as described above in connection with FIGS. 1A-1E.

Process 600 may include additional implementations, such as any single implementation or any combination of implementations described below and/or in connection with one or more other processes described elsewhere herein.

In some implementations, the document may include a government-issued identification card, an employee identification card, a health insurance card, or a transaction card. In some implementations, when obtaining the plurality of preview images, the user device may obtain each of the plurality of preview images at a first resolution. In some implementations, when automatically capturing the image, the user device may automatically capture the image at a second resolution that is higher than the first resolution.

In some implementations, when masking, based on identifying the document in one or more preview images, the portion of the image data not associated with the document in the one or more preview images, the user device may assign a pixel brightness level value, of the portion of the image data not associated with the document in the one or more preview images, to zero.

In some implementations, when masking, based on identifying the document in one or more preview images, the portion of the image data not associated with the document in the one or more preview images, the user device may change a luminance value associated with one or more pixels, of the portion of the image data not associated with the document in the one or more preview images, to zero. In some implementations, the user device may present, for display after masking the portion of the image data not associated with the document in the one or more preview images, a particular preview image of the one or more preview images.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Some implementations, described herein, provide a user device 210 that is capable of implementing a real-time (or near real-time) image analysis of an object in a plurality of preview images by masking image data not related to the object in the plurality of preview images, which may facilitate capturing an image of the object to meet certain image quality standards regarding glare on the object. In some implementations, user device 210 may capture a plurality of preview images of an object and the user device may identify the object in the plurality of preview images. In some implementations, user device 210 may track the object in the plurality of preview images as the user device and/or the object moves while user device 210 captures the plurality of preview images. In some implementations, user device 210 may create a mask to hide image data not associated with the object in the plurality of preview images. In some implementations, user device 210 may determine whether there is glare on the object based on a brightness level associated with one or more pixels associated with the object in the plurality of the preview images. In some implementations, user device 210 may provide feedback to a user of user device 210 regarding how to reduce the glare on the object and may automatically capture an image of the object when the glare on the object is minimized. In some implementations, user device 210 may send the image to a server device 220 for processing (e.g., validation of the object in the image).

In this way, user device 210 optimizes real-time glare detection inside a dynamic region of an image, and processes only image data related to the object in the plurality of preview frames to detect glare. This conserves computing resources, power resources, and memory resources of the user device that would otherwise need to be expended to process all the image data in the plurality of preview frames. Moreover, masking the image data not associated with the object in the plurality of preview images ensures that the user device just detects glare on the object. In this way, user device 210 may guide a user in the image capturing process via real-time (or near real-time) feedback, and ensure that only high-quality images of the object (e.g., images with little-to-no glare on the object) are ultimately captured (and, for example, uploaded to a backend platform for validation). This shortens, and simplifies, the image capturing process, which conserves computing resources, power resources, and memory resources of the user device that would otherwise need to be expended in cases where low-quality images are repeatedly captured. In addition, this conserves computing resources, memory resources, and network resources, associated with a backend platform, that would otherwise need to be expended to receive and process such low-quality images.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    capturing, by a user device, a plurality of preview images,
        wherein each preview image of the plurality of preview images includes image data;
    for a preview image of the plurality of preview images, processing, by the user device in substantially real-time, the preview image to identify an object in the preview image,
        wherein the processing includes determining an outline of the object;
    creating, by the user device and based on determining the outline of the object in one or more preview images of the plurality of preview images, a mask that hides a portion of the image data associated with an area outside of the outline of the object in the one or more preview images to reduce glare on the object;
    determining, by the user device, whether a parameter associated with glare of the object in an area inside the outline of the object in the one or more preview images satisfies a threshold after creating the mask,
wherein the parameter is determined based on:
determining whether a percentage of bright pixels associated with one or more preview images satisfies a first threshold based on a glare histogram, or
determining whether an average glare value of the one or more preview images satisfies a second threshold;
providing, by the user device in substantially real-time, feedback to the user device, based on determining that the parameter does not satisfy the threshold,
wherein the feedback includes an instruction to perform an action with respect to the user device or to the object, and
wherein the instruction includes a continuous or periodic instruction on how to reduce the glare until the parameter satisfies the threshold; and
automatically capturing, by the user device, an image of the object based on determining that the parameter satisfies the threshold.

2. The method of claim 1, wherein creating the mask that hides the portion of the image data associated with the area outside of the outline of the object in the one or more preview images comprises:
setting a pixel intensity value of the portion of the image data associated with the area outside of the outline of the object in the one or more preview images to zero.

3. The method of claim 1, wherein determining whether the parameter associated with the glare of the object in the area inside the outline of the object in the one or more preview images satisfies the threshold comprises:
processing the one or more preview images to determine the parameter,
wherein processing the one or more preview images to determine the parameter comprises:
determining, for each preview image of the one or more preview images, a glare value that indicates a percentage of the image data in the area inside the outline of the object associated with a respective preview image that has the glare;
calculating an average glare value of the one or more preview images based on the glare value of a set of preview images of the one or more preview images; and
assigning the parameter a value that indicates the average glare value.

4. The method of claim 1, further comprising
presenting, for display, a particular preview image of the one or more preview images; and
overlaying, on the particular preview image, a visual mask that corresponds to the mask that hides the portion of the image data associated with the area outside of the outline of the object in the one or more preview images.

5. The method of claim 1, further comprising:
determining, after automatically capturing the image, whether an additional parameter associated with the glare of the object in the area inside the outline of the object in the image satisfies the threshold; and
automatically cropping the object in the image after determining that the additional parameter associated with the glare of the object in the area inside the outline of the object in the image satisfies the threshold.

6. The method of claim 5, wherein automatically cropping the object in the image after determining that the additional parameter associated with the glare of the object in the area inside the outline of the object in the image satisfies the threshold comprises:
cropping the object in the image around the outline of the object.

7. The method of claim 1, wherein the object is a document.

8. A user device, comprising:
one or more memories; and
one or more processors, communicatively coupled to the one or more memories, to:
capture a plurality of preview images,
wherein each preview image of the plurality of preview images includes image data;
for a preview image of the plurality of preview images, process, in substantially real-time, the preview image to identify an object in the preview image;
track, based on identifying the object in one or more preview images of the plurality of preview images, the object in the one or more preview images;
create, based on identifying the object in one or more preview images of the plurality of preview images, a mask that hides a portion of the image data not associated with the object in the one or more preview images to reduce glare on the object;
determine whether a parameter associated with glare of the object in the one or more preview images satisfies a threshold after creating the mask,
wherein the parameter is determined based on:
determining whether a percentage of bright pixels associated with one or more preview images satisfies a first threshold based on a glare histogram, or
determining whether an average glare value of the one or more preview images satisfies a second threshold;
provide, in substantially real-time, feedback to a user of the user device, based on determining that the parameter does not satisfy the threshold,
wherein the feedback includes an instruction to the user to perform an action with respect to the user device or to the object, and
wherein the instruction includes a continuous or periodic instruction on how to reduce the glare until the parameter satisfies the threshold; and
automatically capture an image of the object based on determining that the parameter satisfies the threshold.

9. The user device of claim 8, wherein the one or more processors, when providing, in substantially real-time, feedback to the user of the user device, based on determining that the parameter does not satisfy the threshold, are to:
cause display of a message on a display of the user device indicating that there is too much glare on the object to automatically capture the image of the object.

10. The user device of claim 8, wherein the instruction is to move the object or the user device away from a light source.

11. The user device of claim 8, wherein the instruction is to angle the object away from a light source.

12. The user device of claim 8, wherein the one or more processors, when tracking the object in the one or more preview images, are to:
track a position of the object, a size of the object, and/or an orientation of the object.

13. The user device of claim 8, wherein the one or more processors are further to:

send the image to a server device for validation of the object.

14. The user device of claim 8, wherein the object is a document that indicates identification information.

15. A non-transitory computer-readable medium storing instructions, the instructions comprising:
one or more instructions that, when executed by one or more processors of a user device, cause the one or more processors to:
obtain a plurality of preview images,
wherein each preview image of the plurality of preview images includes image data;
for a preview image of the plurality of preview images, process, in substantially real-time, the preview image to identify a document in the preview image;
track, based on identifying the document in one or more preview images of the plurality of preview images, the document in the one or more preview images;
mask, based on identifying the document in the one or more preview images, a portion of the image data not associated with the document in the one or more preview images to reduce glare on the document;
determine whether a parameter associated with glare of the document in the one or more preview images satisfies a threshold after creating a mask to mask the portion of the image data not associated with the document,
wherein the parameter is determined based on:
determining whether a percentage of bright pixels associated with one or more preview images satisfies a first threshold based on a glare histogram, or
determining whether an average glare value of the one or more preview images satisfies a second threshold;
provide, in substantially real-time, feedback to a user of the user device, based on determining that the parameter does not satisfy the threshold,
wherein the feedback includes an instruction to the user to perform an action with respect to the user device or to the document, and
wherein the instruction includes a continuous or periodic instruction on how to reduce the glare until the parameter satisfies the threshold; and
automatically capture, by the user device, an image of the document based on determining that the parameter satisfies the threshold.

16. The non-transitory computer-readable medium of claim 15, wherein the document includes:
a government-issued identification card,
an employee identification card,
a health insurance card, or
a transaction card.

17. The non-transitory computer-readable medium of claim 15, wherein the one or more instructions, that cause the one or more processors to obtain the plurality of preview images, cause the one or more processors to:
obtain each of the plurality of preview images at a first resolution; and
wherein the one or more instructions, that cause the one or more processors to automatically capture the image, cause the one or more processors to:
automatically capture the image at a second resolution that is higher than the first resolution.

18. The non-transitory computer-readable medium of claim 15, wherein the one or more instructions, that cause the one or more processors to mask, based on identifying the document in the one or more preview images, the portion of the image data not associated with the document in the one or more preview images, cause the one or more processors to:
assign a pixel brightness level value, of the portion of the image data not associated with the document in the one or more preview images, to zero.

19. The non-transitory computer-readable medium of claim 15, wherein the one or more instructions, that cause the one or more processors to mask, based on identifying the document in the one or more preview images, the portion of the image data not associated with the document in the one or more preview images, cause the one or more processors to:
change a luminance value associated with one or more pixels, of the portion of the image data not associated with the document in the one or more preview images, to zero.

20. The non-transitory computer-readable medium of claim 15, wherein the one or more instructions, when executed by the one or more processors, further cause the one or more processors to:
present, for display after masking the portion of the image data not associated with the document in the one or more preview images, a particular preview image of the one or more preview images.

* * * * *